July 21, 1953         C. E. ADAMS         2,646,078
FLOW CONTROL VALVE
Filed Sept. 18, 1947

INVENTOR.
CECIL E. ADAMS
BY
Herschel C. Omohundro
Attorney

Patented July 21, 1953

2,646,078

UNITED STATES PATENT OFFICE 2,646,078

FLOW CONTROL VALVE

Cecil E. Adams, Columbus, Ohio, assignor to The Denison Engineering Company, Columbus, Ohio, a corporation of Ohio Application September 18, 1947, Serial No. 774,837

10 Claims. (Cl. 138—43)

This invention relates to hydraulic apparatus and is particularly directed to flow control valves for use in regulating the volume of fluid supplied to a part of a hydraulic system by a fluid pressure source.

One of the objects of this invention is to provide a flow-control valve which may be positioned in a fluid conductor to regulate the volume of fluid flowing through the conductor regardless of the quantity of fluid being used, or the pressure maintained in the portion of the system controlled by the valve.

Another object of the invention is to provide a flow-control valve which is adapted to be positioned in a fluid conductor, the flow-control valve being adjustable to vary the volume of fluid admitted thereby, into the portion of the hydraulic system served by the valve.

It is a further object of the invention to provide a flow-control valve having a body of generally cylindrical formation, the ends of the body having threaded openings for the connection of the body in a fluid conductor; this body also having an internal chamber for the reception of a spool valve which, through movement, regulates the effective area of fluid passages through the body; the body being provided with a sleeve-like housing adjustable relative to the body to regulate the size of an orifice to create a pressure drop, the pressures at opposite sides of the orifice being used to move the spool so that a predetermined volume of fluid will be permitted to flow through the valve.

A still further object of the invention is to provide an in-line flow control valve having a body with a generally cylindrical shape and an internal chamber communicating with an opening at one end of the body and separated from an opening at the opposite end by a partition, the body having a plurality of lateral ports, certain of which are connected by grooves in a housing surrounding the body; certain of the ports also being connected at their inner ends by a groove formed in a spool disposed for movement in the chamber in the body; certain other ports communicating with the openings at the ends of the body; the housing being adjustable to vary the effective area of certain of the lateral ports to create pressure differentials at opposite ends thereof, the contrasting pressures of the pressure differential being applied to opposite ends of the spool to cause the latter to vary the degree of communication between the ports connected thereby, thus regulating the volume of fluid flowing through the flow-control device.

Further objects and advantages of the present invention will be apparent from the following description, reference being had to the accompanying drawing wherein a preferred form of embodiment of the invention is clearly shown.

Figure 1:
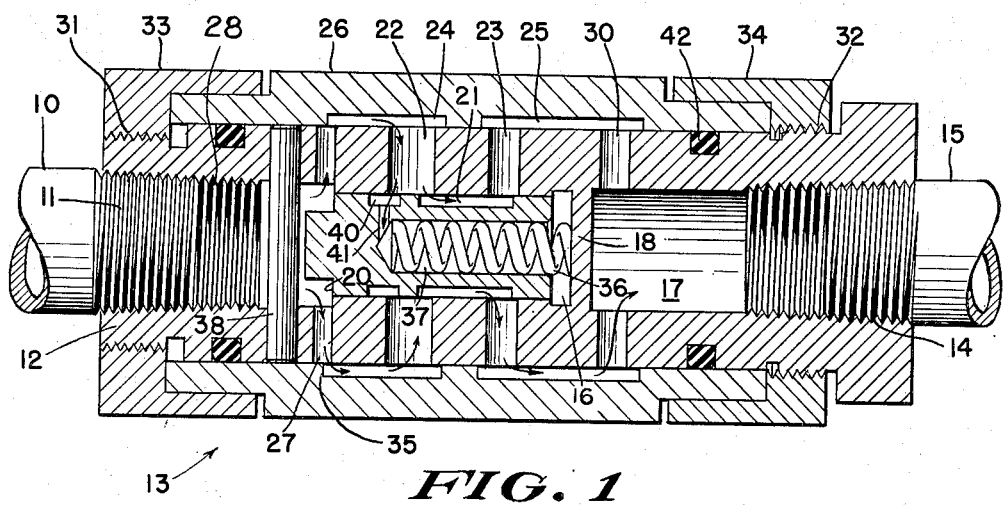
Figure 1 is a vertical longitudinal sectional view taken through a flow-control valve formed in accordance with the present invention.
Figure 2:
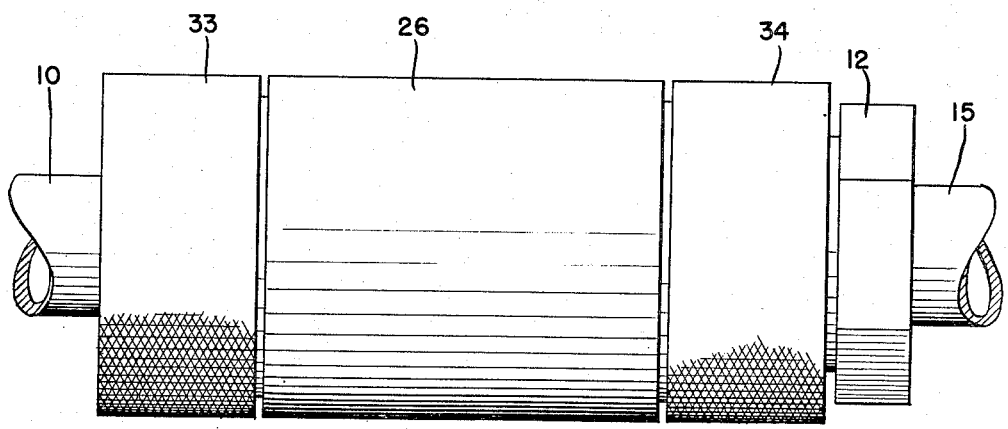
Figure 2 is a side elevational view of the valve shown in Figure 1.

Referring more particularly to the drawing, numeral 10 designates one end of a conductor which is threaded as at 11 for connection with a cylindrical body 12. This body forms a part of the flow-control valve designated generally by the numeral 13, which forms the subject matter of the present invention. The body 12 is also provided with a threaded opening 14 at the opposite end for connection with a conduit 15 constituting a continuation of the conductor 10. The body 12 has an internal chamber 16 formed therein, this chamber being in open communication at one end with the threaded port into which the conduit 10 is placed. The opening 14 communicates with a socket 17 which is separated from the chamber 16 by a partition 18.

Chamber 16 is formed for the slidable reception of a fluid control spool 20, which is provided in its outer surface with an annular groove 21 to establish communication between the inner ends of a pair of laterally extending ports 22 and 23 formed in the body 12. The outer ends of ports 22 and 23 register respectively with grooves 24 and 25 formed in a tubular housing 26 surrounding the body 12. Groove 24 also communicates with the outer ends of reduced lateral ports 27 formed in body 12, the inner ends of these ports communicating directly with the opening for conductor 10; this conductor directs fluid into the interior of the body 12 and, therefore, the opening for this conduit may properly be called the inlet 28 of the valve. Groove 25 in housing 26 communicates with the outer ends of laterally directed ports 30, which at their inner ends communicate with the socket 17. Through this system of communicating ports and grooves, one or more fluid-conducting channels are formed in the member 13.

It will be noted that body 12 is provided adjacent each end with threaded portions 31 and 32 for the reception of knurled adjusting nuts 33 and 34, the inner ends of these nuts overlapping the housing 26. Shoulders formed within these nuts 33 and 34 engage the ends of the housing 26 and regulate the position thereof relative to the body 12. Through the longitudinal adjustment of the housing 26, the shoulder 35 at one end of the groove 24 may be moved over the outer ends of ports 27 to vary the effective area of such ports; these ports function as orifices in the operation of the flow-control valve. It should be obvious that, if the housing 26 is moved toward the right as viewed in Figure 1, the effective area of orifices 27 will be reduced and, when so reduced, will offer resistance to the flow of fluid through the device. This resistance creates a pressure drop between the inlet and outlet sides of the orifice, the former pressure being applied directly to the outer end of spool 20. This spool is normally urged in an outward direction by a coil spring 36 arranged between the partition 18 and the inner end of a socket 37 formed in spool 20. The extent of movement of the spool in response to the force of spring 36 is determined by a transversely extending limit pin 38 received in registering openings formed in body 12. The pressure at the outlet side of the orifices 27 is applied to the inner end of the spool 20 by forming in the outer surface of the spool a second groove 40 and a port 41 which extends from the groove 40 to the inner end of the socket 37. Groove 40 is in constant communication with the inner ends of ports 22 so that fluid from the outlet side of the orifices 27 will have constant access to the inner end of the spool 20. Packing rings 42 are arranged between the body and housing at each end thereof to prevent the escape of fluid pressure between these members.

In the use of the device, fluid is conducted through pipe 10 to the inlet 28. This fluid flows through orifices 27 and groove 24 to ports 22. From these ports fluid flows through groove 21 to the inner ends of ports 23 and from the outer ends thereof to groove 25, fluid flowing from this groove through ports 30 to socket 17 from which it flows through conduit 15. If the relative positions of the body and housing are such as to partially obstruct the orifices 27, a pressure differential will be created, the higher pressure of which will be applied to the outer end of spool 20. This pressure will tend to move the spool in opposition to the total force of spring 36 and the lower pressure of the differential which is applied through port 41 to the inner end of spool 20, so that the shoulder at the outer end of groove 21 will be moved over the inner ends of the ports 22 tending to reduce the effective size thereof. This reduction in size tends to resist or decrease the flow of fluid through the passages thus regulating the volume of fluid admitted to pipe 15. If a greater volume is desired, the knurled nuts 33 and 34 are adjusted to increase the size of orifices 27, thus narrowing the pressure differential and permitting spool 20 to move under the influence of spring 36 to a position providing greater effective area in the passages. It is, of course, obvious that when the pressure varies, spool 20 will move accordingly to maintain the proper effective area and the desired flow.

While the form of embodiment of the present invention as herein disclosed constitutes a preferred form, it is to be understood that other forms might be adopted, all coming within the scope of the claims which follow.

I claim:

1. A flow control device comprising a body with an internal chamber and inlet and outlet ports communicating therewith; a housing around said body and adjustable thereon; a spool disposed for movement in said chamber; cooperative means in said body, housing and spool to form a passage establishing communication between said inlet and outlet ports; means in said housing forming a restriction in said passage to cause a pressure drop, one end of said spool being exposed to inlet port pressure; passage means applying the lower pressure of said pressure drop to the other end of said spool, adjustment of said housing serving to vary the pressure drop caused by said restriction; shoulder means on said spool cooperating with a portion of the passage forming means in said body to control fluid flow through said device; and spring means between said spool and body tending to move the spool to a position to permit maximum flow, inlet port pressure tending to move said spool in opposition to said spring.

2. A flow control device comprising a cylindrical body having an internal chamber, an inlet port at one end of said body connected with said chamber, and an outlet port at the opposite end of said body; a partition separating said outlet port from said chamber; a casing surrounding said body and supported for adjustment relative thereto; cooperative means in said body and casing forming a passage connecting said inlet and outlet ports, shoulder means in said body and casing forming an orifice in said passage, relative adjustment of said body and casing serving to vary the effective area of said orifice; a spool member disposed for movement in said chamber to control fluid flow through said passage, said spool being exposed at opposite ends to the fluid pressures existing on the inlet and outlet sides of said orifice and resilient means normally tending to urge said spool member toward a position in which flow through said passage means is unlimited thereby.

3. A flow control device comprising a generally cylindrical body having an internal chamber and an opening at each end, one opening being directly connected with said chamber and constituting an inlet, the other opening forming an outlet separated from said chamber; a sleeve-like casing disposed on said body for adjustment longitudinally thereof; a spool member positioned for sliding movement in said chamber; a plurality of longitudinally spaced ports extending laterally through said body, the first of said laterally extending ports being located between the outer end of said spool and said inlet, the effective area of said first laterally extending port being varied by the adjustment of said casing, one of said laterally extending ports communicating with said outlet, said casing and said spool having recesses cooperating with the ends of said laterally extending ports to establish a fluid passage extending from said inlet to said outlet through a portion of said chamber, movement of said spool in said chamber serving to control fluid flow through said passage; means tending to urge said spool to a position to establish unrestricted fluid flow; and passage means for applying fluid at the pressure of the outlet end of said first lateral passage to one end of said spool, the opposite end being exposed to inlet pressure.

4. A flow control device comprising a cylindrical body having an opening in each end and a chamber connected with one of the openings, the latter opening constituting an inlet; a partition separating the chamber from the other opening which constitutes an outlet; a plurality of laterally extending ports formed in said body, a pair of such ports communicating with said chamber, one communicating with the outlet and one with said inlet; a casing telescopically receiving said body, said casing having a pair of spaced grooves, the first establishing communication between the port communicating with said inlet and one of the ports extending to said chamber, the other casing groove establishing communication between the second port extending to said chamber and the one communicating with said outlet, movement of said casing relative to said body serving to vary the effective area of the port communicating with said inlet; a spool disposed for sliding movement in said chamber, said spool having a groove to establish communication between the ports extending to said chamber, movement of said spool serving to vary the degree of communication; spring means tending to urge said spool toward a position to provide maximum communication, fluid at inlet pressure being applied to said spool to move the same in opposition to said spring means, and passage means operative to apply fluid pressure existing at the outlet end of the port communicating with said inlet to the end of said spool exposed to the action of said spring.

5. A flow control device comprising a generally cylindrical body with axial openings extending thereinto from each end, the inner ends of said openings being spaced, a spool member disposed for sliding movement in one of said openings, said spool having an external groove; a plurality of ports extending laterally in said body, two of said ports registering with the groove in said spool, another of said ports communicating with the opening receiving said spool at one end of said spool the latter port being restricted and another of said ports communicating with the opposite end of said body, said spool having a passage extending from one of said ports to the opening at the inner end of the opening receiving said spool; means yieldably urging said spool toward a position establishing maximum communication between the ports registering with the groove in said spool; and a sleeve-like housing disposed for longitudinal adjustment on said body, said housing having grooves to connect the outer ends of certain ports to complete a fluid passage through the device, such passage including the restricted port and the groove in said spool movement of said housing serving to vary the effective area of said restricted port and create a pressure differential, the contrasting pressures of said differential being applied to the opposite ends of said spool to move the same in oppositon to said yieldable urging means.

6. A flow control device comprising a cylindrical body having axially aligned inlet and outlet ports and an internal bore, the inlet communicating with the internal bore and the outlet being separated therefrom, said body having a series of longitudinally spaced laterally extending ports leading from said inlet, said outlet port and said bore; a sleeve-like housing disposed for longitudinal adjustment on said body; a spool member disposed for longitudinal movement in the bore in said body, said spool and said housing having grooves disposed to cooperate with the lateral ports to provide a fluid passage between said inlet and outlet ports; means in said sleeve to vary the effective area of the portion of the passage between said inlet and said bore upon adjustment of said sleeve; means on said spool to vary the effective area of said passage between said bore and said outlet port upon movement of said spool; spring means tending to move said spool to increase the effective area of the passage, said spool being responsive to inlet port pressure to move in oppsition to said spring; and passage means for applying the fluid pressure in said bore to the spring pressed end of said spool.

7. A flow control device comprising a cylindrical body with a bore entering each end and a plurality of ports extending laterally from said bores; a partition wall in said body separating the inner ends of said bores; a tubular casing telescopically receiving said body; a spool member disposed for movement in one of said bores, said spool member and said casing having grooves disposed to cooperate with the laterally extending ports in said body to form a passage establishing communication between said bores, one of the ports being restricted by said casing to cause a pressure differential, the higher pressure of which is applied to said spool to move the same in the bore in which it is positioned to reduce the effective area of said passage; spring means between said spool and said partition wall, said spring means tending to move said spool to increase the effective area of said passage; and means forming an additional passage to apply the lower pressure of the pressure differential to the end of the spool engaged by said spring.

8. A flow control device comprising a cylindrical body with a bore entering each end and a plurality of ports extending laterally from said bores; a partition wall in said body separating the inner ends of said bores; a tubular casing telescopically receiving said body; a spool member disposed for movement in one of said bores, said spool member and said casing having grooves disposed in positions to cooperate with the laterally extending ports in said body to form a passage establishing communication between said bores, one of the ports being restricted by said casing to cause a pressure differential, the higher pressure of which is applied to said spool to move the same in the bore in which it is positioned to vary the relation of the groove in said spool and a laterally extending port communicating therewith to reduce the effective area of said passage; spring means between said spool and said partition wall, said spring means tending to move said spool in oppostiion to such higher pressure to increase the effective area of said passage; means forming an additional passage to apply the lower pressure of the pressure differential to the end of the spool engaged by said spring; and means for adjusting said casing longitudinally of said body to vary the restriction causing said pressure differential.

9. A flow control device comprising a cylindrical body with inlet and outlet ports at opposite ends and a chamber opening at one end to the inlet port, said body having a port extending laterally from the inlet and one extending laterally from said chamber; a spool element disposed in said chamber for movement longitudinally thereof; a sleeve element surrounding said body, said sleeve having a recess disposed to establish communication between the outer ends of said ports, said spool having a recess disposed to communicate with the inner end of the port extending from said chamber, the degree of communication being varied by the movement of said spool; spring means tending to move said spool to increase the degree of communication between said port and the recess in said spool, the housing partially obstructing the port extending from said inlet to establish a pressure differential, the end of said spool at the inlet port being exposed to the higher pressure of said differential; and passage means for conducting fluid at the lower pressure of said differential to the other end of said spool.

10. A flow control device comprising a body element having an internal chamber; a spool element disposed for movement in said chamber; a housing element surrounding said body, said body having an inlet and an outlet, said body, spool and housing elements having comunicating ports and grooves formed therein to provide a passage connecting said inlet and outlet; said housing partially obstructing one of the ports to cause a pressure differential at opposite sides of said obstruction, one end of said spool being exposed to the higher pressure of said differential; resilient means tending to move said spool in opposition to the pressure applied to said one end; passage means provided in one of said elements to apply the lower pressure of said pressure differential to the end of said spool opposite said one end; and shoulder means on one of said elements, said shoulder means being operative upon movement of said spool in opposition to said resilient means to vary the flow-conducting capacity of said passage.

CECIL E. ADAMS.

References Cited in the file of this patent

UNITED STATES PATENTS

| Number | Name | Date |
|---|---|---|
| 476,103 | Thomson | May 31, 1892 |
| 485,438 | Thomson | Nov. 1, 1892 |
| 1,640,842 | Loomis | Aug. 30, 1927 |
| 2,306,379 | Conradson | Dec. 29, 1942 |
| 2,327,025 | Davis | Aug. 17, 1943 |